(12) United States Patent
Thomas

(10) Patent No.: US 11,595,573 B2
(45) Date of Patent: Feb. 28, 2023

(54) ADJUSTABLE IMAGING DEVICES

(71) Applicant: Hewlett-Packard Development Company, L.P., Spring, TX (US)

(72) Inventor: Fred Thomas, Fort Collins, CO (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/358,380

(22) Filed: Jun. 25, 2021

(65) Prior Publication Data

US 2022/0417426 A1 Dec. 29, 2022

(51) Int. Cl.
*H04N 5/232* (2006.01)

(52) U.S. Cl.
CPC ..... *H04N 5/23229* (2013.01); *H04N 5/23222* (2013.01); *H04N 5/232935* (2018.08)

(58) Field of Classification Search
CPC .............. H04N 5/232; H04N 5/23229; H04N 5/23222; H04N 5/232935
See application file for complete search history.

(56) References Cited

U.S. PATENT DOCUMENTS

2010/0237880 A1* 9/2010 Lee ................. B82Y 15/00
324/680
2019/0045106 A1* 2/2019 Humfeld ............. H04N 5/3653

* cited by examiner

*Primary Examiner* — Yogesh K Aggarwal
(74) *Attorney, Agent, or Firm* — Knobbe, Martens, Olson & Bear, LLP

(57) ABSTRACT

In some examples, the disclosure describes a nano-position stage, an imaging device coupled to the nano-position stage, and a controller comprising instructions to: instruct the imaging device to capture a first image of a subject, instruct the nano-position stage to alter a position of the imaging device a distance based on a pixel size of the first image, instruct the imaging device to capture a second image of the subject at the altered position, and generate a third image of the subject utilizing the first image and the second image.

15 Claims, 5 Drawing Sheets

ADJUSTABLE IMAGING DEVICES

BACKGROUND

An electronic device can include a computing device that can perform computing functions. In some examples, the computing device can be coupled to an imaging device, such as a camera. The camera can be utilized to capture images of objects and the computing device can be utilized to store and/or display the images captured by the imaging device.

DETAILED DESCRIPTION

Figure 1:
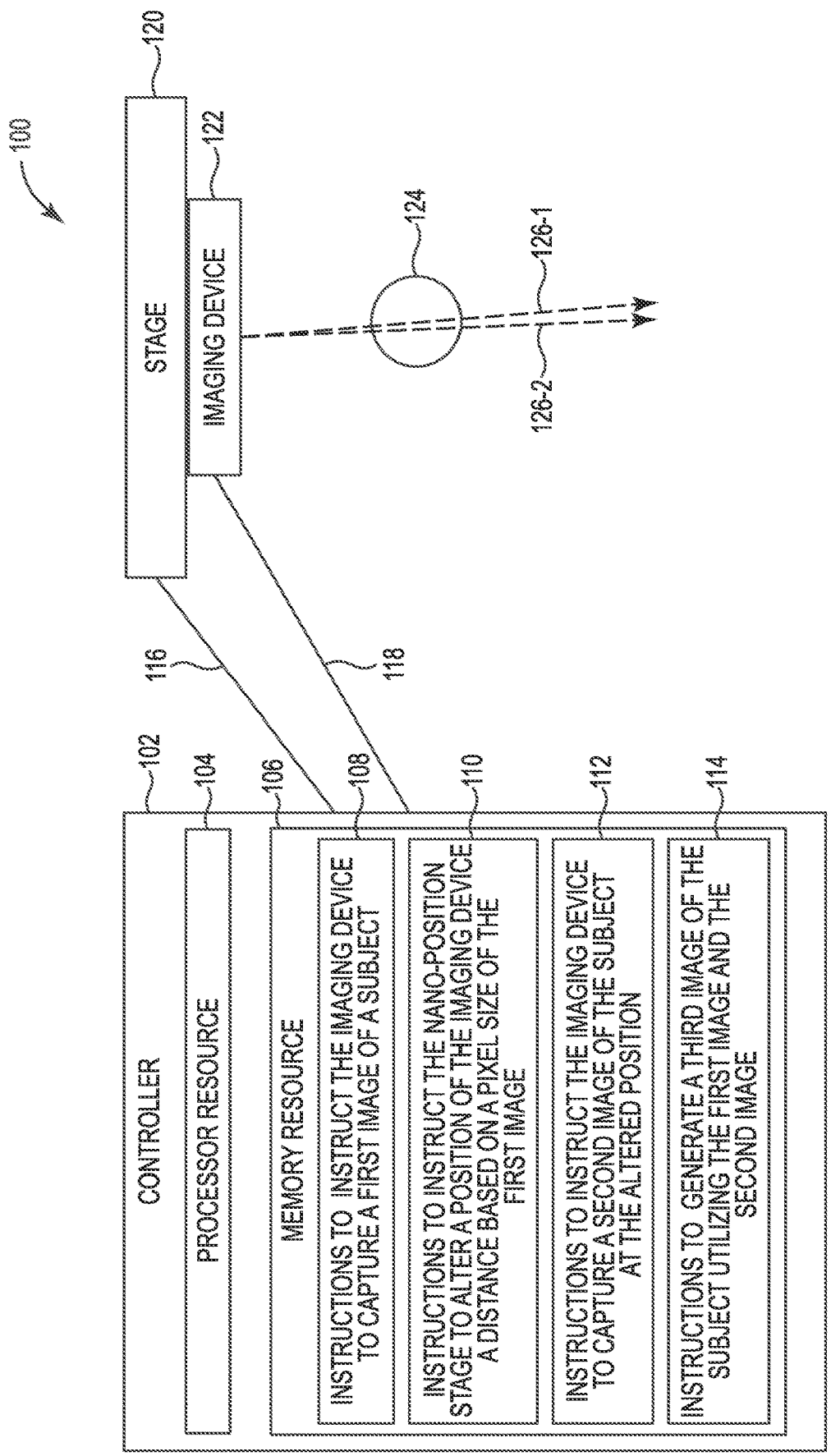
FIG. 1 illustrates an example of a system that includes a computing device for adjustable imaging devices.

A user may utilize a computing device for various purposes, such as for business and/or recreational use. As used herein, the term computing device refers to an electronic system having a processor resource and a memory resource. Examples of computing devices can include, for instance, a laptop computer, a notebook computer, a desktop computer, controller, and/or a mobile device (e.g., a smart phone, tablet, personal digital assistant, etc.), among other types of computing devices.

Electronic devices such as computing devices can be utilized for image processing such as altering an image captured by an imaging device. In some examples, computing devices can be utilized to manage a plurality of devices within a particular imaging system. For example, a computing device can be utilized to manage a plurality of lights, an imaging device (e.g., red, green, blue (RGB) imager, camera, etc.), and/or a stage to alter a position of the imaging device. In this way, the computing device can allow the plurality of devices to work more efficiently together.

In some examples, the computing device can be utilized to store information associated with a plurality of devices of a particular system. For example, the computing device can include a memory resource that can store captured images from an imaging device. In another example, the computing device can store data associated with a particular captured image. For example, the computing device can store lighting settings and/or a position of the imaging device when the particular image was captured. In this way, the computing device can perform operations on captured images utilizing the additional data associated with the captured images.

In some examples, a computing device can be utilized to generate a Bidirectional Reflectance Distribution Function (BRDF) image of a subject of a captured image. As used herein, a BRDF image is an image that is generated utilizing the BRDF or similar function. As use herein, BRDF refers to a function of variables that defines how light is reflected at a surface (e.g., opaque surface, etc.). In some examples, the BRDF can utilize an incoming light direction and outgoing direction from the subject and returns the ratio of reflected radiance exiting along to the irradiance incident on the surface of the subject from a particular direction.

In some examples, the computing device can utilize a plurality of captured images of a subject to generate the BRDF image of the subject and/or determine particular qualities of the subject. In some examples, the plurality of images can be captured with altered lighting angles or altered lighting settings. In some examples, an image quality associated with the plurality of captured images can affect a corresponding quality of the generated BRDF image. For example, a relatively higher image quality associated with the plurality of captured images can correspond to a relatively higher quality of the BRDF image and/or data generated utilizing the BRDF for the plurality of captured images.

In some examples, the image quality associated with the plurality of captured images can be limited by functions or properties of an imaging device. For example, a particular imaging device can capture images at a particular image quality. In some examples, increasing the image quality can increase a quality of other aspects of a system utilizing the imaging device. For example, the system utilizing the imaging device can compare captured images to determine a specific color of a subject. In this way, a relatively higher image quality can allow the system to better determine the specific color of the subject. In another example, increasing the image quality of images captured by the imaging device can increase a quality of the generated BRDF image.

The present disclosure relates to adjustable imaging devices that can be utilized to generate images with a greater image quality for a particular imaging device. In some examples, the particular imaging device can be limited by functions or properties that can limit a resolution for images captured by the particular imaging device. In previous examples, the particular imaging device could be replaced with a different imaging device that included hardware that could captured images with a higher resolution than the particular imaging device. However, the different imaging device could have a relatively higher cost than the particular imaging device that is currently being utilized by a system.

The present disclosure can utilize a moveable stage to allow an imaging device to capture a plurality of images of a subject at different locations. In these examples, a computing device associated with the imaging device can utilize the plurality of images to generate an image with a higher resolution than the plurality of images by using a super-resolution restoration method. In this way, a system can capture images with a relatively higher resolution utilizing an imaging device that captures images at a relatively lower resolution. These higher resolution images can be utilized improve post-processing methods such as, but not limited to BRDF.

FIG. 1 illustrates an example of a system 100 that includes a computing device 102 for adjustable imaging devices 122. In some examples, the computing device 102 can include a processor resource 104 communicatively coupled to a memory resource 106. As described further herein, the memory resource 106 can include instructions 108, 110, 112, 114 that can be executed by the processor resource 104 to perform particular functions. In some examples, the computing device 102 can be associated with a plurality of light sources, a moveable stage 120, and/or an imaging device 122 (e.g., camera, scanner, optical sensor, etc.). In some examples, the imaging device 122 can be physically decoupled from the imaging device optics coupled to the moveable stage 120 (e.g., nano-position stage, etc.). For example, the imaging device 122 can be a photo sensor and the imaging device optics can be lenses or other optical devices that can focus light on to the phot sensor.

In some examples, the computing device 102 can send signals or instructions to the moveable stage 120 and/or or components of the moveable stage 120 through a communication path 116. In some examples, the communication path 116 can be a wired or wireless connection that can allow the computing device 102 to send signals to the moveable stage 120 and/or allow the moveable stage to send signals to the computing device 102. In some examples, the computing device 102 can send or receive signals with the imaging device 122 through a communication path 118. In some examples, the computing device 102 can send instructions to the imaging device 122 that instruct the imaging device 122 to capture an image of a subject 124. In some examples, the imaging device 122 can send captured images of the subject 124 to the computing device through the communication path 118. As described further herein, the computing device 102 can store the captured images in a memory device such as the memory resource 106.

The computing device 102 can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114. In other examples, the computing device 102 can include instructions 108, 110, 112, 114, stored on a machine-readable medium (e.g., memory resource 106, non-transitory computer-readable medium, etc.) and executable by a processor resource 104. In a specific example, the computing device 102 utilizes a non-transitory computer-readable medium storing instructions 108, 110, 112, 114, that, when executed, cause the processor resource 104 to perform corresponding functions.

In some examples, the computing device 102 can include instructions 108 to instruct the imaging device 122 to capture a first image of a subject 124. In some examples, the computing device 102 can instruct the imaging device 122 to capture the first image of the subject 124 from a first location. In some examples, the imaging device 122 can capture an image of the subject 124 from the first location on the nano-position stage 120 along a first path 126-1. In this way, the first image of the subject 124 can be from a first angle along the first path 126-1 when the imaging device 122 is positioned at a first location on the nano-position stage 120. In some examples, the first image can correspond to a first set of images. For example, the first image can refer to a plurality of images that are captured at the first location utilizing a plurality of different light settings within an enclosure. In some examples, the plurality of different light settings can be based on a post processing method that is to be utilized with the plurality of images. For example, the plurality of images can be utilized as inputs for a BRDF image or BRDF analysis.

As used herein, the nano-position stage 120 can include a surface to couple the imaging device 122 at a particular location on the surface. In some examples, the nano-position stage 120 can move the surface in a plurality of directions that can change a position or location of the imaging device 122 relative to the subject 124. In some examples, the nano-position stage 120 can utilize piezoelectric devices that can move the surface of the nano-position stage 120 and/or move the imaging device 122 to a plurality of different locations relative to the subject 124. In some examples, the piezoelectric devices can be piezoelectric motors that can utilize piezoelectric materials to move the stage or surface of the nano-position stage 120 which moves the location of the imaging device 120 relative to the location of the subject 124. The nano-position stage 120 is described further herein in FIG. 4.

In some examples, the computing device 102 can include instructions 110 to instruct the nano-position stage 120 to alter a position of the imaging device 122 a distance based on a pixel size of the first image. As described herein, the nano-position stage 120 can alter a position of a stage or surface that can move the imaging device 122 that is coupled to the stage or surface. In some examples, the distance that the nano-position stage 120 moves to alter the position of the imaging device 122 can be based on the pixel size of the first image such that a difference between the first image and a captured second image is approximately greater than one pixel and an additional incremental portion of one pixel. For example, a size of a pixel for the first image can be 1.0 micrometer. In this example, the physical distance that the nano-position stage 120 moves the imaging device 122 can generate a second image that is approximately 1.5 pixels or 1.5 micrometers different from the first image.

In some examples, the position of the imaging device 122 is moved a physical distance such that a pixel distance between a pixel of the first image and a corresponding pixel of the second image is less than the pixel size of the first image. For example, the size of a pixel for the first image can be 1.0 micrometers. In this example, the difference between a first pixel of the first image and a corresponding second pixel of the second image can be less than 0.5 micrometers. As used herein, a pixel from the first image and a corresponding pixel from the second image can represent that same element or portion of the subject 124. In some examples, the distance between a pixel in a first image and a corresponding pixel in a second image can be referred to as a pixel distance or pixel distance difference between the first image and the second image.

In some examples, the nano-position stage 120 moves the imaging device 122 a first distance that corresponds to a pixel distance plus an increment distance within a captured image that is a second distance. For example, the physical distance that the nano-position stage 120 moves the imaging device 122 can be different than the pixel distance between a pixel of a first image and a corresponding pixel of a second image. In some examples, the physical distance that the nano-position stage 120 moves can be relatively smaller than the pixel distance. For example, the nano-position stage 120 can move the imaging device 122 a distance of 0.5 micrometers from a first location that was used to capture a first image to generate a second image. In this example, the pixel distance can be 1.0 micrometer or the difference between a pixel in the first image can be 0.5 micrometer from the corresponding pixel in the second image. In this way, the imaging device 122 can be utilized to capture a first image at a first location. The computing device 102 can determine a distance to move the imaging device 122 based on a pixel size of the first image. The computing device 102 can then instruct the nano-position stage 120 to move the distance to a second location such that a resulting image will have a particular pixel distance from the first image and instruct the imaging device 122 to capture the second image at the second location. Thus, in some examples, the physical distance that the nano-position stage 120 moves the imaging device 122 can be based on a resolution of the imaging device 122 and corresponding pixel size generated by the resolution of the imaging device 122.

In some examples, the nano-position stage 120 can include a piezoelectric device to alter the nano-position stage 120 along a first axis and a second axis. That is, the nano-position stage 120 can alter a location of the imaging device 122 two-dimensionally relative to the subject 122. In some examples, the nano-position stage 120 can include a first piezoelectric device that can move the stage, surface, and/or imaging device 122 in a first direction (e.g., along a first axis, along an x-axis, etc.). In these examples, the nano-position stage 120 can include a second piezoelectric device that can move the stage, surface, and/or imaging device 122 in a second direction (e.g., along a second axis, along a y-axis, etc.). In this way, the nano-position stage 120 can provide XY movement combinations to move the surface of the stage and/or the imaging device 122 in two-dimensional directions relative to the subject 124.

As described herein, the nano-position stage 120 can include a piezoelectric device (e.g., piezoelectric motor, etc.) to move the imaging device 122 in a first direction in increments of 100 nanometers and move the imaging device 122 in a second direction in increments of 100 nanometers. For example, the imaging device 122 can be positioned at a first location. In this example, the nano-position stage 120 can move the imaging device in a first direction 100 nanometers to capture an image at a second location. In this way, the imaging device 122 can capture a plurality of images along an x-axis and y-axis relative to the subject 124. Although a distance or increment of 100 nanometers is illustrated, other increments can be utilized without departing from the present disclosure. However, the increments may need to be relatively minor and/or precise to achieve a sub-pixel distance that is less than a size of a pixel of an image captured by the imaging device 122.

In some examples, the computing device 102 can include instructions 112 to instruct the imaging device 122 to capture a second image of the subject 124 at the altered position. As described herein, the nano-position stage 120 can move the imaging device 122 to the altered position or second position to capture the second image of the subject 124. As described herein, the altered position can be a physical distance that corresponds to a sub-pixel size of the first image or a pixel distance to be captured in the second image. In this way, the difference (e.g., pixel distance, etc.) between the first image and the second image can be relatively small (e.g., less than a distance of a pixel, etc.). In some examples, the altered position can be along an axis relative to the subject 124 such that the first image is captured along path 126-1 and the second image is captured along path 126-2. Thus, the first image can be captured from a first angle relative to the subject 124 and the second image can be captured from a second angle relative to the subject 124.

In some examples, the computing device 102 can include instructions 112 to generate a third image of the subject 124 utilizing the first image and the second image. In some examples, the computing device 102 can generate an image with a higher resolution utilizing a super-resolution restoration method utilizing a plurality of images that are captured at different locations or positions of the nano-positioning stage 120. For example, the super-resolution restoration method can utilize the first image from a first location along path 126-1 and the second image from the second location along path 126-2 to generate a third image that has a relatively higher resolution than the first image and the second image. Although two images (e.g., first image, second image, etc.) are described as specific examples, the super-resolution restoration method can utilize a plurality of additional images that are captured a corresponding plurality of locations to generate the third image with a relatively higher resolution.

In some examples, the super-resolution restoration method can refer to a class of techniques that can enhance (e.g., increase) a resolution of a subject utilizing a plurality of images of the subject. In an optical super-resolution restoration method, the diffraction limit of systems can be transcended, while in geometrical super-resolution restoration the resolution of a digital imaging sensor can be enhanced. In some examples, the super-resolution restoration method can include a multiple-frame super-resolution restoration method. In a multiple-frame super-resolution restoration, sub-pixel shifts between a plurality of images of the same scene or subject can be utilized. In some examples, the plurality of images can be utilized to generate an improved resolution image by deconstructing and then fusing information from the plurality of images.

In some examples, the pixel distance and/or physical distance can be determined based on a super-resolution restoration method utilized to generate the third image utilizing the first image and the second image as input images for the super-resolution restoration method. For example, the super-resolution restoration method can be utilized for a particular pixel distance between images to allow the generated third image to include a relatively higher resolution than the first image and the second image. In this way, the physical distance the nano-positioning stage 120 moves the imaging device 122 can be based on a selected super-resolution restoration method and corresponding pixel distance of the selected super-resolution restoration method. In this way, the resolution of the third image can be increased by selecting a physical distance or coordinate for the first location and the second location of the imaging device 122 to utilize a difference in sub-pixel distance between the first image and the second image specific to the selected super-resolution restoration method.

In some examples, the system 100 can be utilized to generate images of the subject 124 that include a relatively higher resolution than is capable for the imaging device 122 by utilizing a plurality of images captured by the imaging device 122 for a super-resolution restoration method. In these examples, the relatively higher resolution images that are generated utilizing the super-resolution restoration method can be utilized to generate relatively higher quality post processing of the plurality of images, such as inputs for a Bidirectional Reflectance Distribution Function (BRDF) image of the subject 124.

Figure 2:
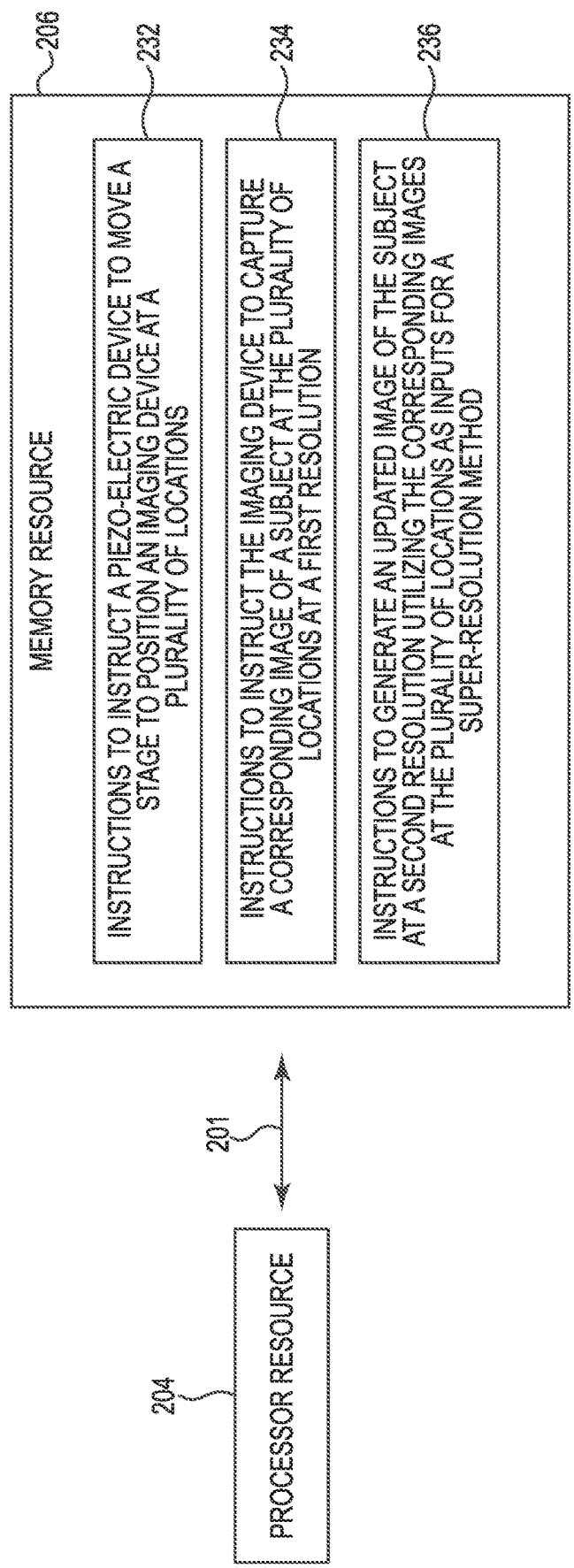
FIG. 2 illustrates an example of a memory resource for adjustable imaging devices.

FIG. 2 illustrates an example of a memory resource 206 for adjustable imaging devices. In some examples, the memory resource 206 can be a part of a computing device or controller that can be communicatively coupled to a system (e.g., system 100 as referenced in FIG. 1, etc.). For example, the memory resource 206 can be part of a computing device 102 as referenced in FIG. 1. In some examples, the memory resource 206 can be communicatively coupled to a processor resource 204 that can execute instructions 232, 234, 236 stored on the memory resource 206. For example, the memory resource 206 can be communicatively coupled to the processor resource 204 through a communication path 201. In some examples, a communication path 201 can include a wired or wireless connection that can allow communication between devices and/or components within a device or system.

The memory resource 206 may be electronic, magnetic, optical, or other physical storage device that stores executable instructions. Thus, a non-transitory machine readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource 206) may be disposed within a controller and/or computing device. In this example, the executable instructions 232, 234, 236 can be "installed" on the device. Additionally, and/or alternatively, the non-transitory machine readable medium (e.g., a memory resource) can be a portable, external or remote storage medium, for example, that allows a computing system to download the instructions 232, 234, 236 from the portable/external/remote storage medium. In this situation, the executable instructions may be part of an "installation package". As described herein, the non-transitory machine readable medium (e.g., a memory resource 206) can be encoded with executable instructions for performing calculations or computing processes.

The instructions 232, when executed by a processor resource such as the processor resource 204, can include instructions to instruct a piezoelectric device to move a stage to position an imaging device at a plurality of locations. As described herein, a stage can be a moveable platform or base that can have a coupling mechanism to couple or connect an imaging device to a surface of the stage. In some examples, the piezoelectric device can be a piezoelectric motor that can be utilized to move the stage or surface in increments of a particular distance. For example, the piezoelectric device can move the stage in a plurality of directions in increments of 10-500 nanometers, among other increments. In this way, the physical location of the imaging device can be altered to a plurality of locations relative to a subject.

In some examples, the piezoelectric device can be a motor based on the change in shape of a piezoelectric material when an electric field is applied, as a consequence of the converse piezoelectric effect. In these examples, a voltage or current applied to the piezoelectric material can alter the shape of the piezoelectric material in a particular way such that the location of the imaging device can be altered in a precise and consist direction and distance. In this way, the imaging device can be positioned at specific locations based on a particular super-resolution restoration method. For example, the particular super-resolution restoration method can be directed to be utilized for a plurality of images that are altered by a particular distance between pixels of the plurality of images. In this way, the piezoelectric material can be utilized to adjust the imaging device a particular physical distance based on a pixel distance for the super-resolution restoration method to be utilized to generate an image of the subject at a relatively higher resolution.

The instructions 234, when executed by a processor resource such as the processor resource 204, can include instructions to instruct the imaging device to capture a corresponding image of a subject at the plurality of locations at a first resolution. As described herein, the imaging device can be instructed to capture an image at the plurality of locations to generate a plurality of images. In some examples, the plurality of images can be of the same subject at a plurality of angles. In this way, each of the plurality of images can be utilized with a super-resolution restoration method to generate an additional image of the subject with a relatively higher resolution than the plurality of images captured by the imaging device.

In some examples, a portion of the plurality of corresponding images can be within a distance of a pixel size from a particular corresponding image at a particular location. As described herein, the piezoelectric device can move the imaging device in relatively small increments such that a first pixel of a first image is a relatively small distance from a corresponding second pixel of a second image. In this way, pixels from the first image can be utilized with corresponding pixels from the second image to increase a resolution of the portion of the subject represented by the pixels to generate an image with a higher resolution. In some examples, the imaging device can capture a first image at a first location and the piezoelectric device can move the imaging device 100 nanometers in a first direction to a second location to capture a second image.

The instructions 236, when executed by a processor resource such as the processor resource 204, can include instructions to generate an updated image of the subject at a second resolution utilizing the corresponding images at the plurality of locations as inputs for a super-resolution restoration method. In these examples, the second resolution is greater than the first resolution. As described herein, a super-resolution restoration method can utilize the plurality of images that are offset or captured at an altered angle or location by the imaging device to increase a resolution of the image. In some examples, the super-resolution restoration method can deconstruct the input images and utilize data from the input images to generate an updated image of the subject with a relatively higher resolution.

In some examples, the memory resource 206 can include instructions to instruct the piezoelectric device to move the stage from a first location to a second location in a first direction relative to the subject, instruct the piezoelectric device to move the stage from the first location to a third location relative to the subject to capture an additional image, and generate an additional updated image of the subject at a third resolution utilizing the corresponding images at the plurality of locations and the additional image as inputs for the super-resolution restoration method. As described herein, some of the examples herein describe utilizing a first image that is captured at a first location and a second image that is captured at a second location. However, additional images that are captured at a plurality of additional locations can be utilized to generate additional images with a relatively greater resolution.

In some examples, a plurality of additional images can be captured at a plurality of additional locations and utilized to generate additional images utilizing the super-resolution restoration method until the generated additional image reaches a threshold resolution. For example, a plurality of images can be captured from a plurality of corresponding locations and utilized to generate an image of a subject. The resolution of the generated image can be determined. In these examples, a target or threshold resolution can be compared to the resolution of the generated image to determine if the generated image has a resolution that is equal to or exceeds the threshold resolution. In these examples, additional images at additional locations can be captured by the imaging device and utilized with the plurality of images to generate an additional image utilizing the super-resolution restoration method. In some examples, the threshold resolution can be a particular input resolution for a Bidirectional Reflectance Distribution Function (BRDF) image of the subject.

Figure 3:
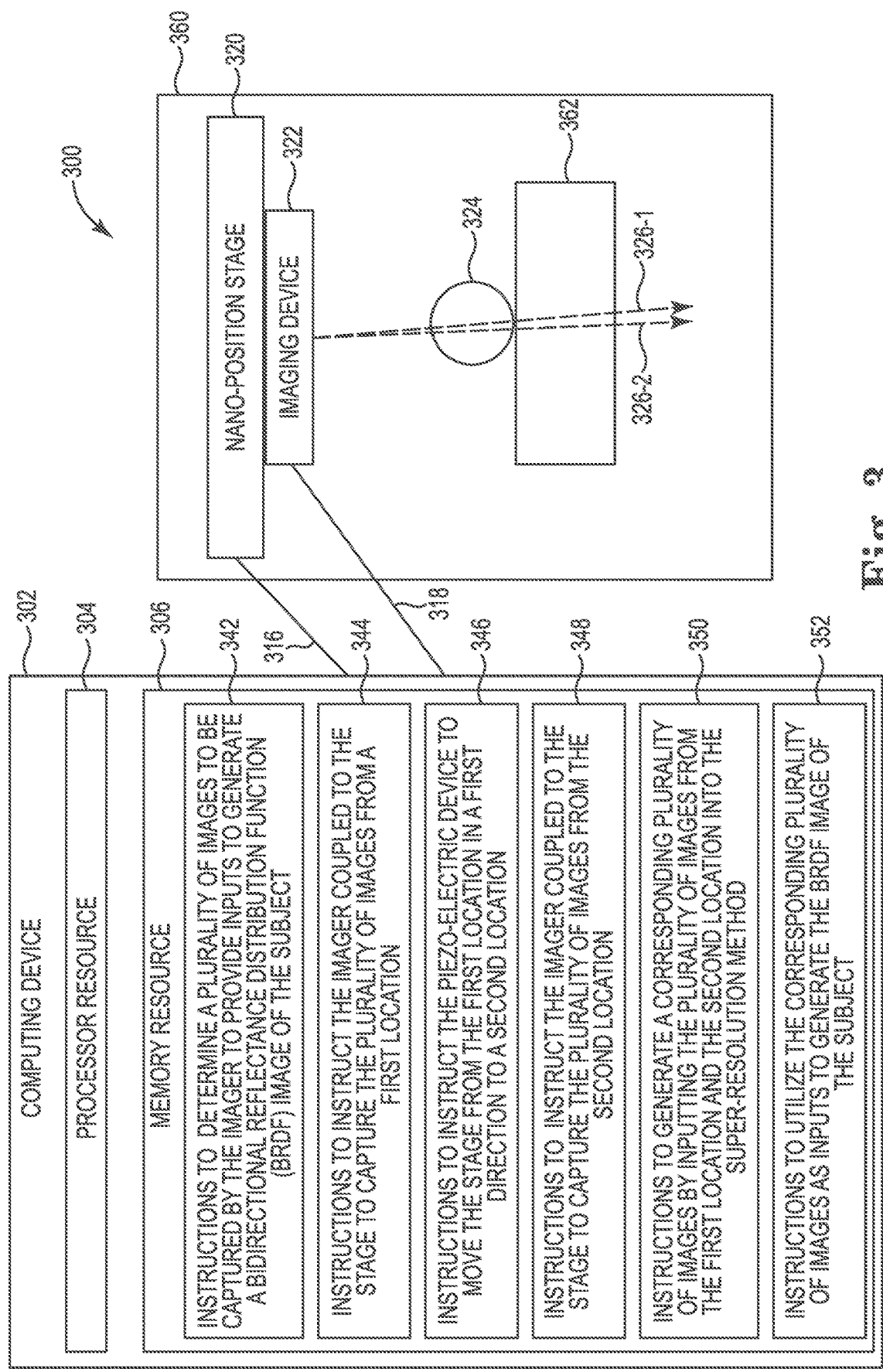
FIG. 3 illustrates an example of a system that includes a computing device for adjustable imaging devices.

FIG. 3 illustrates an example of a system 300 that includes a computing device 302 for adjustable imaging devices. In some examples, the system 300 can include a subject 324 on a platform 362 positioned within an enclosure 360. In some examples, the enclosure 360 can include a plurality of light sources that can be directed at the subject 324 from a plurality of locations within the enclosure to illuminate the subject 324 from a plurality of directions.

In some examples, the platform 362 can be a structure to position the subject 324 at a particular location within the enclosure 360. For example, the enclosure 360 can include light sources that are coupled to an interior and directed to surround the subject 324 when the subject 324 is coupled or positioned on the platform 362. In this way, the plurality of light sources can be directed at a plurality of surfaces of the subject 324 when the imaging device 322 captures an image of the subject 324. In this way, the image illumination directionality of captured images of the subject 324 can be altered by altering the plurality of light sources directed at the subject 324. In addition, the enclosure 360 can be utilized to block exterior light or elements from interacting with the subject 324 or other components of the system 300, which could lower an image quality of directionally illuminated captured images of the subject 324. The enclosure 360 is described further herein with respect to FIG. 5.

In some examples, the enclosure 360 can enclose or surround an imaging device 322 coupled to the nano-position stage 320. As described herein, the imaging device 322 can be coupled to a moveable surface of the nano-position stage 320. For example, the nano-position stage 320 can utilize piezoelectric devices to move the surface or stage of the nano-position stage 320 which alters a location of the imaging device 322. In some examples, the computing device 302 can send instructions to the nano-position stage 320 through a communication path 316 and the computing device 302 can send instructions to the imaging device 322 through a communication path 318. In this way the computing device 302 can be utilized to instruct the nano-position stage 320 to position the imaging device 322 at a plurality of locations and instruct the imaging device 322 to capture images of the subject 324 from the plurality of locations.

In some examples, the computing device 302 can also be utilized to alter lighting settings of the plurality of light sources. In some examples, the computing device 302 can be utilized to instruct the imaging device 322 to capture a plurality of images at a first location with a plurality of different lighting settings before instructing the nano-position stage 320 to move the imaging device 322 to a second location. In these examples, the computing device 302 can instruct the imaging device 322 to capture a plurality of images at the second location with the plurality of different lighting settings.

In some examples, the computing device 302 can be a device that includes a processor resource 304 communicatively coupled to a memory resource 306. As described herein, the memory resource 306 can include or store instructions 342, 344, 346, 348, 350, 352, that can be executed by the processor resource 304 to perform particular functions.

In some examples, the computing device 302 can include instructions 342 that can be executed by a processor resource 304 to determine a plurality of images to be captured by the imaging device 322 to provide inputs to generate a Bidirectional Reflectance Distribution Function (BRDF) image of the subject. In some examples, the BRDF image can be an analysis of the subject 324. The analysis can be performed by altering a direction of a plurality of light sources and capturing images at the altered direction of the plurality of light sources. In some examples, the system 300 can be a BRDF measurement device (e.g., photometric stereoscopic device and/or gonioreflectormeter, etc.). In some examples, the system 300 can employ one or more goniometric arms to position a light source and a detector at various directions from a subject 324 to be measured. To measure a full BRDF, this process can be repeated many times, moving the light source each time to measure a different incidence angle.

In this way, a plurality of images can be captured of the subject 324 utilizing a plurality of different lighting angles or lighting settings. These plurality of images can be utilized to generate a BRDF image or BRDF analysis of the subject 324. In some examples, a quality of the BRDF image or BRDF analysis of the subject 324 can be based on an image quality of the plurality of captured images from the imaging device 322. In this way, increasing the image quality or resolution of the plurality of images of the subject 324 can increase a quality of the BRDF image or BRDF analysis. In some examples, each of the plurality of images with the different lighting angles can be captured a plurality of times at different locations to increase an image quality of the plurality of images to be utilized to generate the BRDF image or BRDF analysis. That is, the plurality of lighting settings can each have a plurality of images captured to generate an updated or higher resolution image for the plurality of lighting settings to be utilized as inputs for the BRDF image or BRDF analysis.

In some examples, the computing device 302 can include instructions 344 that can be executed by a processor resource 304 to instruct the imaging device 322 coupled to the stage of the nano-position stage 320 to capture the plurality of images from a first location. In some examples, the plurality of images can be captured utilizing a corresponding plurality of lighting angles to generate a first set of input images for the BRDF image. In previous examples, the plurality of images can be input into the BRDF to generate the BRDF image and/or BRDF analysis for the subject 324. In these previous examples, a quality of the BRDF image that is generated can be based on a resolution of the imaging device 322.

In some examples, the computing device 302 can include instructions 346 that can be executed by a processor resource 304 to instruct the piezoelectric device to move the stage of the nano-position stage 320 from the first location in a first direction to a second location. As described herein, the nano-position stage 320 can utilize piezoelectric motors or other piezoelectric devices to alter the location of the imaging device 322 by altering a stage of the nano-position stage 320. In this example, the imaging device 322 can be coupled to a particular location of the stage of the nano-position stage 320 and the piezoelectric motors can alter the location of the stage, which can alter the location of the imaging device 322 relative to the subject 324.

In some examples, the computing device 302 can include instructions 348 that can be executed by a processor resource 304 to instruct the imaging device 322 coupled to the stage of the nano-position stage 320 to capture the plurality of images from the second location. In some examples, the plurality of images captured at the first location can have a first angle or a first path 326-1 and the plurality of images captured at the second location can have a second angle or a second path 326-2 relative to the subject 324. In this way, the plurality of images that are captured at the first location can have a pixel distance difference from the plurality of images that are captured at the second location.

As described herein, the pixel distance or pixel distance difference can be a distance between a pixel captured at the first location and a same or corresponding pixel captured at the second location. In these examples, the pixel distance difference within the images can correspond to a physical distance difference between the first location and the second location. For example, the physical distance between the first location and the second location can be 100 nanometers and the pixel distance difference between the images can be 1.0 micrometers. In some examples, the computing device 302 can determine a physical distance between the first location and the second location based on a particular pixel distance to be utilized for a super-resolution restoration method. In some examples, the plurality of images can be input into a super-resolution restoration method to generate an additional plurality of images with a relatively greater image quality or resolution. In these examples, the pixel distance difference can be selected based on the super-resolution restoration method selected.

In some examples, the computing device 302 can include instructions 350 that can be executed by a processor resource 304 to generate a corresponding plurality of images by inputting the plurality of images from the first location and the second location into the super-resolution restoration method. As described herein, the super-resolution restoration method can be utilized to increase the resolution of the plurality of images captured at the first location and the second location. In this way, the generated corresponding plurality of images can have a higher resolution with the corresponding lighting angles to be utilized as inputs for the BRDF. In this way, a quality of a BRDF image or BRDF analysis can be increased with the increased image resolution associated with the generated corresponding plurality of images.

In some examples, the computing device 302 can include instructions 352 that can be executed by a processor resource 304 to utilize the corresponding plurality of images as inputs to generate the BRDF image of the subject 324. As described herein, the corresponding plurality of images can be used as the inputs for the BRDF image of the subject 324. In this way, the quality of the BRDF image can be increased without having to alter the imaging device 322 or utilize a different imaging device that can capture images with a higher resolution. As described herein, the system 300 can have cost restraints or size restraints that can limit a type of imaging device that is utilized with the system 300.

Figure 4:
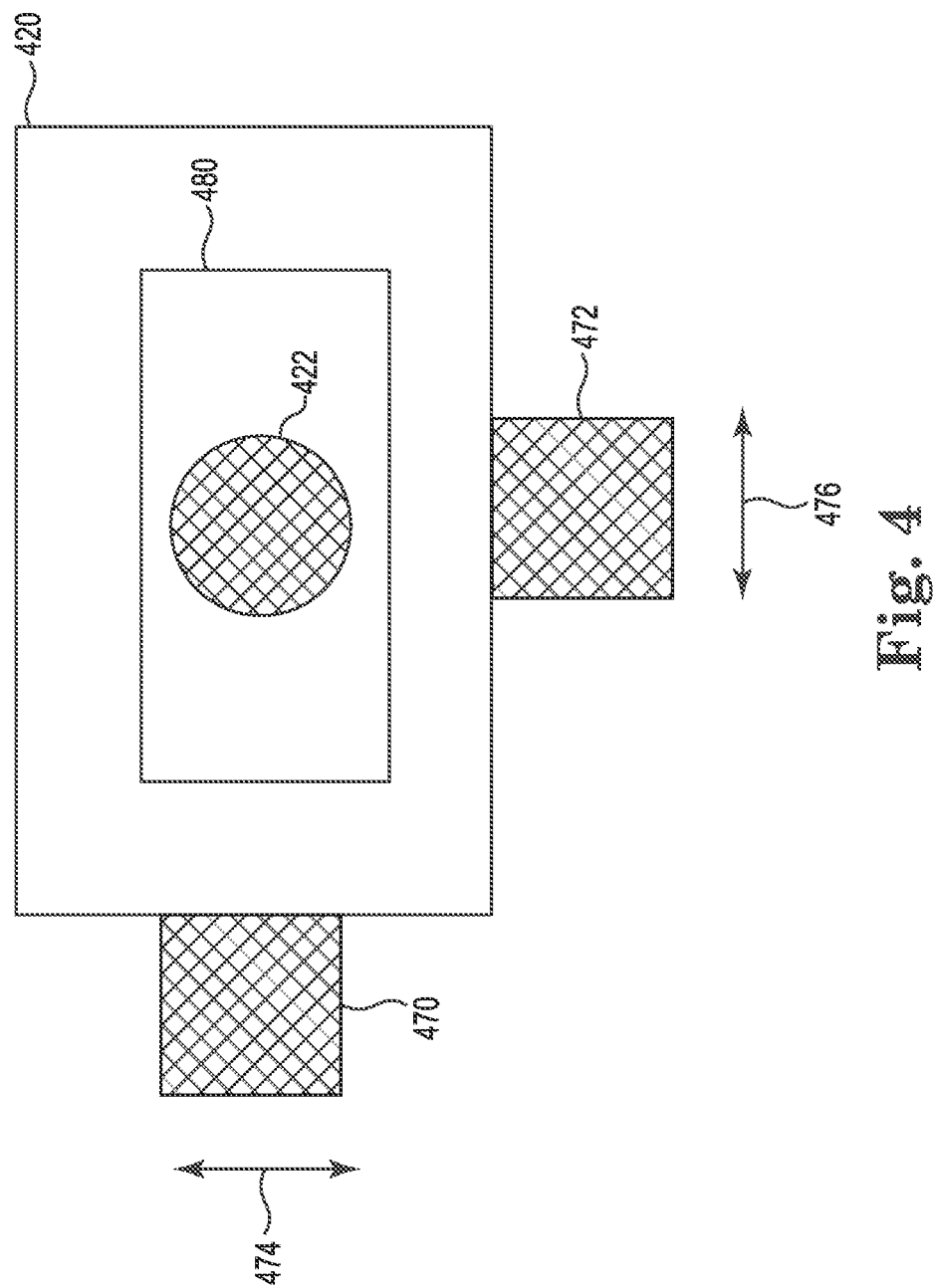
FIG. 4 illustrates an example of a nano-position stage for adjustable imaging devices.

FIG. 4 illustrates an example of a nano-position stage 420 for adjustable imaging devices. As described herein, a nano-position stage 420 can include a stage 480 (e.g., surface, mounting surface, etc.) that can be utilized to mount an imaging device 422. In these examples, the imaging device 422 can be coupled to the stage 480 of the nano-position stage 420 at a fixed location or position. In some examples, the nano-position stage 420 can move the stage 420 to a plurality of different locations in an x direction and/or y direction, which can alter the location or position of the imaging device 422 relative to a subject.

In some examples, the nano-position stage 420 can include a first piezoelectric device 470 that can move the stage 480 along the axis 474. In these examples, the first piezoelectric device 470 can move the stage 480 in a first direction along the axis 474 to move the imaging device 422 in the first direction. In some examples, the first piezoelectric device 470 can be a piezoelectric motor that can utilize piezoelectric materials to move the stage 480 along the axis 474. In some examples, the nano-position stage 420 can include a second piezoelectric device 472 that can move the stage 480 along the axis 476. For example, the second piezoelectric device 472 can move the stage 480 to move the imaging device 422 along the axis 476. In some examples, the piezoelectric device 470 and/or the piezoelectric device 472 can move the imaging device 422 from a first location to a second location a particular distance. In some examples, the particular distance can be between is between 10 and 3000 nanometers.

In this way, the nano-position stage 420 can move the stage 480 and/or imaging device 422 to capture a plurality of images at a plurality of different locations. In some examples, the first piezoelectric device 470 and the second piezoelectric device 472 can be utilized in combination to move the stage 480 and/or imaging device 422 to specific locations along the axis 474 and the axis 476 such that a pixel difference between a first image captured at a first location and a second image captured at a second location is within a pixel size of the captured images.

Figure 5:
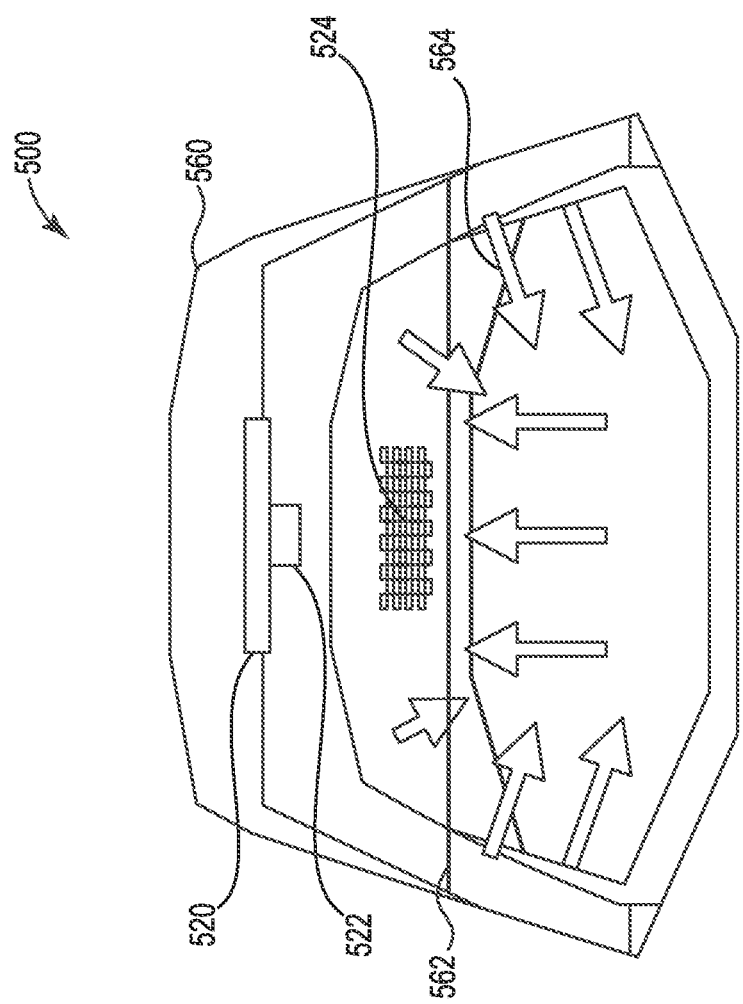
FIG. 5 illustrates an example of a system for adjustable imaging devices.

FIG. 5 illustrates an example of a system 500 for adjustable imaging devices. In some examples, the system 500 can be representation of the system 100 as referenced in FIG. 1 and/or system 300 as referenced in FIG. 3. For example, the system 500 can include an enclosure 560 that can enclose an imaging device 522 that is coupled to a surface of a nano-position stage 520. As described herein, the imaging device 522 can be directed to a subject 524 positioned on a platform 562 to capture images of the subject 524.

In some examples, the enclosure 560 can include reflective interior surfaces that can allow a plurality of light sources to generated light 564 that can be angled in a plurality of ways relative to the subject 524. In some examples, the system 500 can be utilized to generate BRDF images or BRDF analysis of the subject 524. In these examples, the reflective interior and/or generated light 564 at a plurality of angles can allow the system 500 to alter the angled light 564 a plurality of times and capture corresponding images with the altered angled light 564. In these examples, the plurality of images can be utilized as inputs for the BRDF to generate BRDF images or BRDF analysis.

As described herein, the system 500 can include a nano-position stage 520 that can alter a location of the imaging device 522 such that for each alteration of angled light 564 a plurality of images at different locations can be captured by the imaging device 522 to increase an image quality or resolution for each of the plurality of images with the altered angled light 564. In this way, a quality of the BRDF image or BRDF analysis can be increased by utilizing a captured images with a relatively higher resolution than the imaging device 522 is capable of capturing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure.

Since many examples can be made without departing from the spirit and scope of the system and method of the disclosure, this specification merely sets forth some of the many possible example configurations and implementations.

What is claimed is:

1. A device, comprising:
a nano-position stage;
an imaging device physically decoupled from the imaging device optics coupled to the nano-position stage; and
a controller comprising instructions to:
   instruct the imaging device to capture a first image of a subject;
   instruct the nano-position stage to alter a position of the imaging device a distance based on a pixel size of the first image;
   instruct the imaging device to capture a second image of the subject at the altered position; and
   generate a third higher resolution image of the subject utilizing the first image and the second image, wherein the third higher resolution image of the subject is utilized to generate a Bidirectional Reflectance Distribution Function (BRDF) image of the subject.

2. The device of claim 1, wherein the nano-position stage includes a piezoelectric device to alter the nano-position stage along a first axis and a second axis.

3. The device of claim 1, wherein the position of the imaging device is moved a distance such that a distance between a pixel of the first image and a corresponding pixel of the second image is less than the pixel size of the first image.

4. The device of claim 1, wherein the distance is based on a resolution of the imaging device and corresponding pixel size generated by the resolution of the imaging device.

5. The device of claim 1, wherein the nano-position stage includes a piezoelectric device to move the imaging device in a first direction in increments of ½ to ¹⁄₁₀₀ a size of the imaging devices pixel and move the imaging device in a second direction in increments of ½ to ¹⁄₁₀₀ the size of the imaging devices pixel.

6. The device of claim 1, wherein the nano-position stage moves the imaging device a first distance that corresponds to a sub-pixel distance within a captured image that is a second distance.

7. The device of claim 1, wherein the distance is determined based on a super-resolution restoration method utilized to generate the third image utilizing the first image and the second image as input images for the super-resolution restoration method.

8. A non-transitory memory resource storing machine-readable instructions stored thereon that, when executed, cause a processor resource to:
   instruct a piezoelectric device to move a stage to position an imaging device at a plurality of locations;
   instruct the imaging device to capture corresponding images of a subject at the plurality of locations at a first resolution;
   generate updated images of the subject at a second resolution utilizing the corresponding images at the plurality of locations as inputs for a super-resolution restoration method; and
   utilize the updated images as inputs to generate a Bidirectional Reflectance Distribution Function (BRDF) image of the subject.

9. The memory resource of claim 8, wherein the second resolution is equal to the first resolution.

10. The memory resource of claim 8, wherein a portion of the plurality of corresponding images are within a distance of a pixel size from a particular corresponding image at a particular location.

11. The memory resource of claim 8, wherein the processor resource is to:
   instruct the piezoelectric device to move the stage from a first location to a second location in a first direction relative to the subject;
   instruct the piezoelectric device to move the stage from the first location to a third location relative to the subject to capture an additional image; and
   generate an additional updated image of the subject at a third resolution utilizing the corresponding images at the plurality of locations and the additional image as inputs for the super-resolution restoration method.

12. A system, comprising:
a subject on a platform positioned within an enclosure;
a piezoelectric device coupled to a stage within the enclosure;
an imaging device directed at the platform coupled to the stage; and
a computing device, comprising a processor resource to:
   determine a plurality of images to be captured by the imaging device to provide inputs to generate a photometric stereo surface capture device which includes a Bidirectional Reflectance Distribution Function (BRDF) image capture of a the subject;
   instruct the imaging device coupled to the stage to capture the plurality of images from a first location;
   instruct the piezoelectric device to move the stage from the first location in a first direction to a second location;
   instruct the imaging device coupled to the stage to capture the plurality of images from the second location;
   generate a corresponding plurality of images by inputting the plurality of images from the first location and the second location into a super-resolution restoration method; and
   utilize the corresponding plurality of images as inputs to generate the BRDF image of the subject.

13. The system of claim 12, wherein a distance between the first location and the second location is between ½ to ¹⁄₁₀₀ a size of the imaging devices pixel size.

14. The system of claim 12, wherein a distance between the first location and the second location is based on a size of a pixel for the imaging device.

15. The system of claim 12, comprising instructions to:
   instruct the piezoelectric device to move the stage from the first location in a second direction to a third location;
   instruct the imaging device coupled to the stage to capture the plurality of images from the third location; and
   generate a corresponding plurality of images by inputting the plurality of images from the first location, second location, and third location into the super-resolution restoration method.

* * * * *